(12) United States Patent
Samanta et al.

(10) Patent No.: US 10,938,261 B2
(45) Date of Patent: Mar. 2, 2021

(54) COVERING ELEMENT FOR COVERING A SLOT BETWEEN TWO ADJACENT TOOTH TIPS OF AN ELECTROMAGNETIC MACHINE

(71) Applicant: SIEMENS GAMESA RENEWABLE ENERGY A/S, Brande (DK)

(72) Inventors: Subhra Samanta, Ikast (DK); Hans-Joergen Thougaard, Silkeborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 51 days.

(21) Appl. No.: 16/127,381

(22) Filed: Sep. 11, 2018

(65) Prior Publication Data

US 2019/0081525 A1 Mar. 14, 2019

(30) Foreign Application Priority Data

Sep. 14, 2017 (EP) ..................................... 17191123

(51) Int. Cl.
| | | |
|---|---|---|
| *H02K 3/48* | (2006.01) | |
| *H02K 3/487* | (2006.01) | |
| *H02K 1/16* | (2006.01) | |
| *H02K 3/493* | (2006.01) | |
| *H02K 3/34* | (2006.01) | |

(52) U.S. Cl.
CPC ............. *H02K 3/487* (2013.01); *H02K 1/165* (2013.01); *H02K 3/493* (2013.01); *H02K 1/16* (2013.01); *H02K 3/34* (2013.01); *H02K 3/345* (2013.01)

(58) Field of Classification Search
CPC ............ H02K 1/16; H02K 1/165; H02K 3/34; H02K 3/345; H02K 3/48; H02K 3/487; H02K 3/493

USPC .................................... 310/89, 90, 214, 215
See application file for complete search history.

(56) References Cited

U.S. PATENT DOCUMENTS

| | | | | |
|---|---|---|---|---|
| 6,335,582 B1* | 1/2002 | Abukawa | ............... | H02K 1/146 310/156.38 |
| 6,674,209 B2* | 1/2004 | Tong | ...................... | H02K 3/493 310/214 |
| 2004/0189136 A1* | 9/2004 | Kolomeitsev | .......... | H02K 1/148 310/216.082 |

(Continued)

FOREIGN PATENT DOCUMENTS

| | | | | |
|---|---|---|---|---|
| CH | 97953 A | 2/1923 | | |
| FR | 517593 A | * 5/1921 | ............. | H02K 3/493 |

(Continued)

OTHER PUBLICATIONS

FR 517593, English Machine Translation (Year: 1920).*

*Primary Examiner* — Tulsidas C Patel
*Assistant Examiner* — Rashad H Johnson
(74) *Attorney, Agent, or Firm* — Schmeiser, Olsen & Watts LLP

(57) ABSTRACT

Provided is a covering element for covering a slot between two adjacent teeth of an electromagnetic machine, a stator for an electromagnetic machine and a method of forming a covering element. The covering element comprises a first sub-element and a second sub-element. The first sub-element and the second sub-element are arranged adjacent to each other in a first direction. Further, the second sub-element is made of a different material than the first sub-element.

12 Claims, 3 Drawing Sheets

(56) References Cited

U.S. PATENT DOCUMENTS

| | | | | |
|---|---|---|---|---|
| 2005/0189835 A1* | 9/2005 | Drubel | ............... | H02K 3/22 |
| | | | | 310/214 |
| 2006/0028083 A1* | 2/2006 | Costin | ............... | H02K 1/278 |
| | | | | 310/156.55 |
| 2010/0123365 A1* | 5/2010 | Gasparini et al. | ..... | H02K 3/487 |
| | | | | 310/214 |
| 2012/0049697 A1* | 3/2012 | Andarawis | ............ | H02K 11/20 |
| | | | | 310/68 B |
| 2019/0238021 A1* | 8/2019 | Kinouchi et al. | ...... | H02K 3/493 |

FOREIGN PATENT DOCUMENTS

| | | | |
|---|---|---|---|
| FR | 517593 | A | 5/1921 |
| FR | 1430882 | A | 3/1966 |
| GB | 593600 | A | 10/1947 |
| GB | 964175 | A | 7/1964 |
| JP | S59136040 | A | 8/1984 |

\* cited by examiner

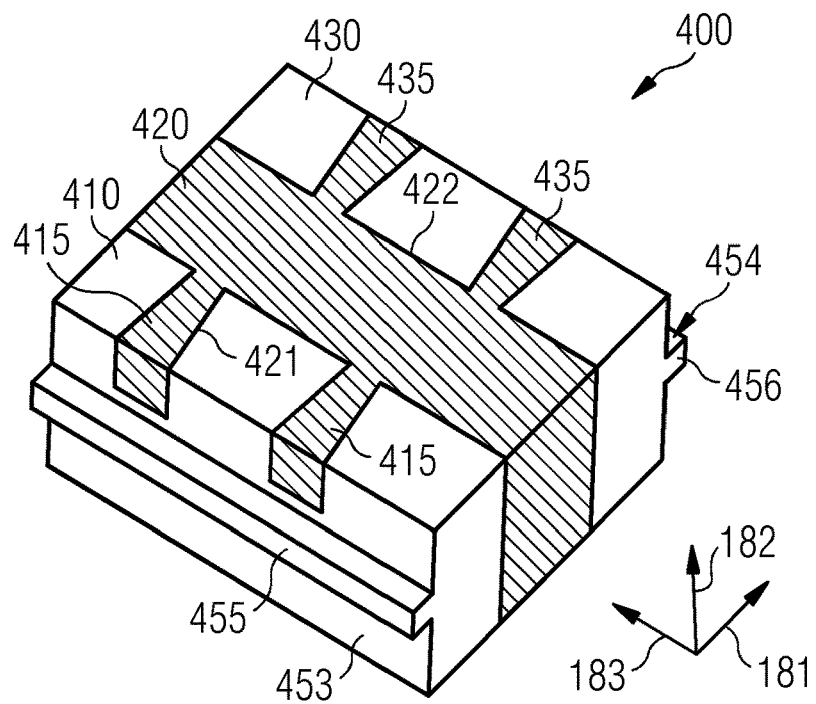
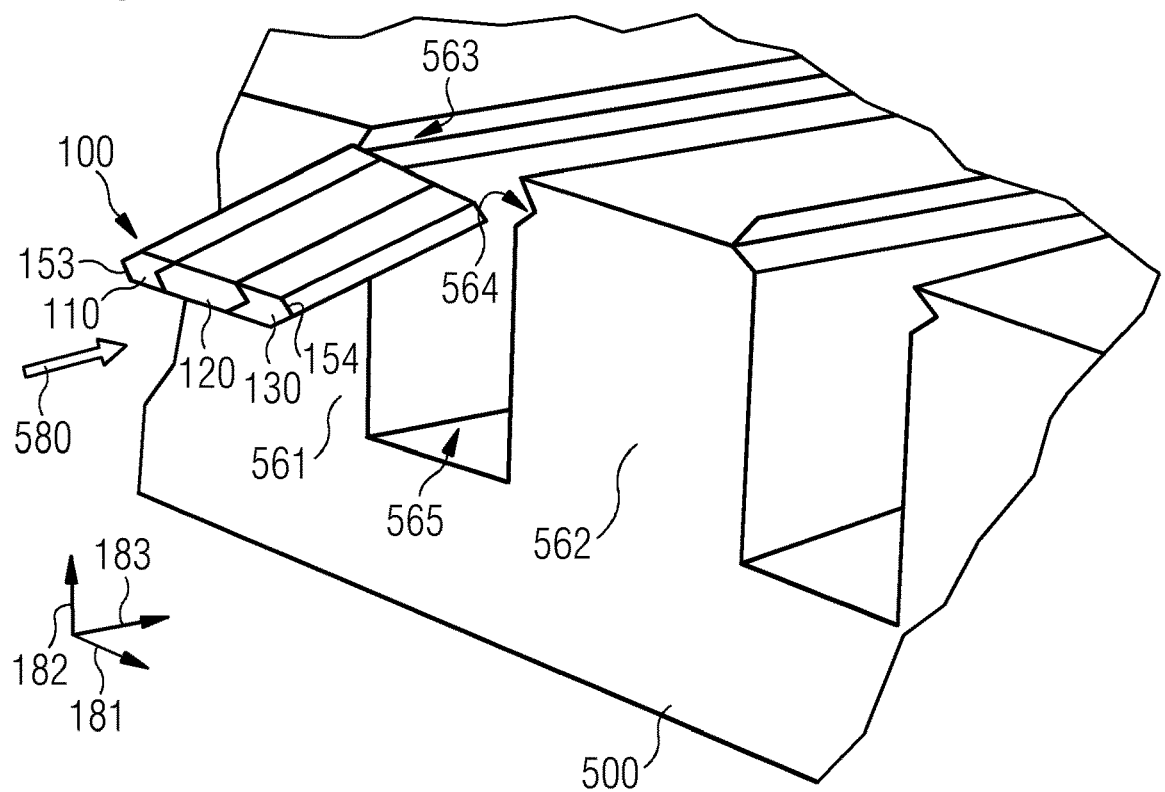

COVERING ELEMENT FOR COVERING A SLOT BETWEEN TWO ADJACENT TOOTH TIPS OF AN ELECTROMAGNETIC MACHINE

CROSS-REFERENCE TO RELATED APPLICATIONS

This application claims priority to European application No. EP 17191123.3 having a filing date of Sep. 14, 2017 the entire contents both of which are hereby incorporated by reference.

FIELD OF TECHNOLOGY

The following relates to the field of flux linkage between the rotor and the stator of an electromagnetic machine. Particularly, the present invention relates to a covering element for covering a slot between two adjacent tooth tips of an electromagnetic machine and a method of forming a covering element.

BACKGROUND

In today's electromagnetic machines a radially enlarged tooth tip is provided at each tooth of a stator for reducing a poor flux linkage of a wide slot opening between adjacent teeth of the stator.

As shown in FIG. 8, a stator 800 comprises a first tooth 861 and a second tooth 862 with a slot 865 in-between. A coil 870 is inserted in the slot 865. Each tooth 861, 862 has a symmetric tooth tip. Each tooth tip comprises two grooved portions 881. Between the grooved portions 881 a conventional covering element 890 made of a non-magnetic material, is inserted for closing a gap between the grooved portions 881 and for insulating the grooved portion 881 from the other grooved portion 881. The gap is i.a. necessary for inserting the coil 870 into the slot 865.

In some current solutions, stator teeth are provided with circumferential enlarged tooth tips for ameliorating a flux linkage between the rotor and the stator. However, an insertion of the stator coil in the slot between adjacent teeth may be difficult because of the shape of the radially enlarged tooth tips.

Hence, a damage of the inserted coil may be the consequence. Particularly, the turn-turn insulation as well as the main wall insulation may be damaged during the insertion. Additionally, these damages of the turn-turn insulation and/or the main wall insulation may not be found during a production acceptance testing. However, these damages may reduce the insulation lifetime and hence the lifetime of the electromagnetic machine.

The lifetime of an electromagnetic machine is crucial from the economic perspective. Further, the reliability of the electromagnetic machine is a key factor for the operational costs.

SUMMARY

An aspect relates to a reliable and simple covering element for an electromagnetic machine which is able to enhance a flux linkage in the electromagnetic machine.

According to a first aspect of embodiments of the present invention a covering element for covering a slot between two adjacent tooth tips of an electromagnetic machine. The covering element comprises a first sub-element and a second sub-element. The first sub-element and the second sub-element are arranged adjacent to each other in a first direction. The second sub-element is made of a different material than the first sub-element.

The tooth tip is arranged at a radially inner end or a radially outer end of a stator tooth. Whether the tooth tip is arranged on the radially inner end or the radially outer end depends on the stator used in the electromagnetic machine. The covering element is arranged between the tip regions of two adjacent teeth of the electromagnetic machine such that the covering element covers the slot in-between the two adjacent teeth. Hence, the covering element may secure a stator coil inserted into the slot, inside the slot and at the same time may link the magnetic flux from the rotor to the stator.

The sub-element is a portion of the covering element. Each sub-element may be formed individually and may then be linked/fixed together. The linkage of the different sub-elements may be a mechanical linkage, moulding or a chemical linkage. For example, the second sub-element may be glued with a two component epoxy glue, as for example Araldite, to the first sub-element. According to another exemplary embodiment, the first sub-element and the second sub-element get bonded together with an expandable resin laminate during a vacuum pressure impregnation process.

The first direction of the covering element may correspond to the circumferential direction of the electromagnetic machine, i.e. the circumferential direction of the stator. Hence, the sequential arrangement in the first direction, when the covering element is mounted between one tooth and another tooth, is the one tooth, the first sub-element, the second sub-element and the other tooth.

Advantageously, a ripple in an air gap flux caused by a change in reluctance due to a conventional slot may be reduced. Furthermore, the covering element according to embodiments of the invention may reduce a cogging torque and a torque ripple. Additionally, the covering element is easily mounted to the stator teeth.

Additionally, the covering element may increase the performance of the electromagnetic machine by creating lower losses and thereby shorter payback time.

According to a further exemplary embodiment of the present invention, the covering element further comprises a third sub-element. The first sub-element, the second sub-element and the third sub-element are arranged adjacent to each other in the first direction such that the second sub-element is arranged in-between the first sub-element and the third sub-element. Further, the second sub-element is made of a different material than the first sub-element and the third sub-element.

The second sub-element may be glued with a two component epoxy glue, as for example Araldite, to the first sub-element and the third sub-element. According to another exemplary embodiment, the first sub-element, the second sub-element and the third sub-element get bonded together with an expandable resin laminate during a vacuum pressure impregnation process.

According to a further exemplary embodiment of the present invention, the covering element further comprises a fourth sub-element. The fourth sub-element is arranged in-between the first sub-element and the second sub-element or in-between the third sub-element and the second sub-element.

The fourth sub-element is made of a magnetic material, a soft magnetic material or a non-magnetic material.

According to a further exemplary embodiment of the present invention, the first sub-element and the third sub-element are configured for being each coupled to a tip region of a tooth.

The coupling of the first sub-element and the third sub-element, respectively, to the tooth tip is made by a press fit. A first side surface seen in the first direction of the first sub-element is press fitted to a flank of a first tooth tip. Further, a second side surface of the third sub-element seen in the first direction is press-fitted to a flank of a second tooth tip. The first tooth tip and the second tooth tip are adjacent tooth tips. The first side surface and the second side surface are located on opposing sides of the covering element seen in the first direction.

The flux linkage between the rotor and the tooth tips is directed as the first sub-element and the third sub-element are made of another material than the second sub-element. Additionally, the entire slot between two adjacent tooth tips is covered with the covering element. Hence, no air gaps are formed between the tip regions of the teeth.

By coupling each of the first sub-element and the third sub-element to a tooth tip, a slot ripple in an air gap flux caused by changes in a reluctance due to the slot may be reduced because a flux linkage may be provided by the first sub-element and the third sub-element, respectively, such that the magnetic flux do have a better flux path. Therefore, the efficiency of the electromagnetic machine may be improved.

Additionally, an open slot between the two tooth tips can be formed wider than in a conventional stator. Hence, a coil may be inserted without using a special inserting tool. Hence, the coil may not be damaged during insertion and the lifetime of the insulation may not be compromised and hence increased.

Furthermore, when the covering element comprises the first sub-element and the second sub-element, the first sub-element and the second sub-element are configured for being each coupled to a tip region of the tooth.

According to a further exemplary embodiment of the present invention, a first magnetic permeability of the first sub-element is higher than a second magnetic permeability of the second sub-element.

According to a further exemplary embodiment of the present invention, a third magnetic permeability of the third sub-element is higher than the second magnetic permeability of the second sub-element.

The magnetic permeability is a dimension for the ability of a material to foster the formation of a magnetic field within itself The first sub-element's magnetic permeability and the third sub-element's magnetic permeability can be higher than the second sub-element's magnetic permeability. The first magnetic permeability can be equal to the third magnetic permeability. Hence, the magnetic flux linkage to the two different adjacent tooth tips will be equally distributed.

On the one hand, when the magnetic permeability is low, there is no flux linkage or only a low flux linkage over the second sub-element. Hence, the two adjacent tooth tips are decoupled with respect to the magnetic flux. On the other hand, when the magnetic permeability is high, the flux leakage between the two neighbouring stator teeth is high.

By providing the first sub-element and the third sub-element, respectively, with a higher magnetic permeability than the second sub-element, at the same time a good flux linkage between the rotor and the stator tooth, via the first sub-element and the third sub-element, without a flux leakage between two adjacent tooth tips over the second sub-element may be formed and maintained. Hence, a better flux linkage may be achieved and thereby an increased efficiency.

The covering element can be made as a single part that has different properties in different areas. As an example, the covering element could be made from SMC powder where different types of powder with specific permeability is placed in a die in areas where the specific permeability is required, after the pressing and heat treatment the covering element has different permeabilities in different areas.

As an alternative to SMC stainless steel powder with different permeability (like austinitic, ferritic, etc. can also be used) placing the different powder materials in the die in the areas where the specific properties are required. After pressing the material is sintered. This covering element has a very high mechanical robustness.

The width of the areas with different properties can be varied to any width by moving a separation in the filling-equipment in the pressing machine, and thereby give different properties to the covering element.

According to a further exemplary embodiment of the present invention, the second sub-element is made of a non-magnetic material or a soft magnetic material. Further, the first sub-element and the third sub-element are made of a magnetic material or a soft magnetic material.

Furthermore, when the covering element comprises the first sub-element and the second sub-element, the second sub-element is made of a non-magnetic material or a soft magnetic material, and the first sub-element is made of a magnetic material or a soft magnetic material.

When the first sub-element and the second sub-element or the first sub-element, the second sub-element and the third sub-element are each made of a sot magnetic material, the magnetic permeability of the second sub-element is lower than the magnetic permeability of the first sub-element and/or the third sub-element.

The non-magnetic material is for example a fiber glass laminate.

Additionally, a length of the second sub-element in the first direction being of a non-magnetic material and the lengths of the first sub-element and the third sub-element in the first direction being of a magnetic material may be individually varied based on the needed performance and/or magnetic linkage. Particularly, the length and/or the shape of the first sub-element and the third sub-element may be optimized based on electromagnetic performance calculation.

The first sub-element and the third sub-element may be made of two different magnetic materials for influencing the respective amount of magnetic flux through the first sub-element and the third sub-element, respectively.

Furthermore, the non-magnetic second sub-element may reduce magnetic flux losses between two adjacent stator teeth compared to a complete magnetic covering element.

According to a further exemplary embodiment of the present invention, the first sub-element comprises a first coupling section and the third sub-element comprises a second coupling section. Furthermore, the first coupling section and the second coupling section are each coupleable in a respective groove of the two tooth tips.

The coupling section is a portion of the respective sub-element at which the sub-element is in contact with one flank of a stator tooth.

The first coupling section and the second coupling section may each have a shape which is axis-symmetric to a plane extending in the radial direction of the stator and being at a middle position between the first coupling section and the second coupling section.

The groove which is formed in the flank of the tooth, has a shape which corresponds to the shape of the first coupling section and the second coupling section, respectively.

The first coupling section and the second coupling section may be press-fitted to the respective groove. Hence, the covering element is inserted between two adjacent stator teeth with a high force and may not fall out due to operational agitations or vibrations.

According to a further exemplary embodiment of the present invention, the first coupling section and the second coupling section are each formed as a protrusion in the shape of a V, a W, a semi-circle, a semi-ellipse, a semi-drop, a polygon, a triangle and/or a rectangle.

The covering element further comprises a third direction which extends perpendicular to the first direction. The third direction may be parallel to the rotational axis of the electromagnetic machine in which the covering element is integrated.

The coupling section being in the shape of in the present application means that the respective outer side surface of the sub-element facing the stator tooth, seen in a cross-sectional view having a normal being parallel to the second direction, has a defined shape. By defining that shape, the transmittable force as well as the holding force between the sub-element and the respective stator tooth is increased due to an increased friction between the coupling section and the groove. Hence, the stability of the covering element in the stator is increased. Therefore, the covering element may not inadvertently fall out the slot between the respective stator teeth.

According to a further exemplary embodiment of the present invention, a sum of a first length of the first sub-element in the first direction, a second length of the second sub-element in the first direction and a third length of the third sub-element in the first direction is a total length in the first direction. Further, a middle of a length of the second sub-element in the first direction coincides with a middle of the total length in the first direction.

The length of the sub-element is defined as the maximal length of the sub-element in the first direction. Particularly, when the coupling section of the sub-element is formed as a protrusion in a V-shape, the length is measured from the point of inflexion of the V.

Particularly, the first coupling section is formed identical to a first coupling surface between the first sub-element and the second sub-element and the second coupling section is formed identical to a second coupling surface between the third sub-element and the second sub-element. Further, the first coupling surface, the second coupling surface, the first coupling section and the second coupling section are all formed as protrusions in a V shape. Then, the first length is measured from the point of inflexion of the V of the first coupling section to the point of inflexion of the V of the first coupling surface. Similarly, the third length is then measured from the point of inflexion of the V of the second coupling section to the point of inflexion of the V of the second coupling surface.

The total length is measured from the outermost position of the first coupling section in the first direction to the outermost position of the second coupling section in the first direction. For example, when the first coupling section and the second coupling section are both formed as a protrusion in the shape of a V, the total length is measured from the point of inflexion of the one V to the point of inflexion of the other V.

The middle of the second length of the second sub-element in the first direction coincides with the middle of the total length in the first direction in this application describes that the covering element is formed such that the second sub-element is arranged in the middle of the covering element. Preferably, when the second sub-element is axis-symmetric to the middle of the second length, the covering element is axis-symmetric to the middle of the total length. In this exemplary embodiment, the second sub-element is arranged in the middle of the covering element. Therefore, the flux linkage between the first sub-element and a stator tooth is equal to the flux linkage between the third sub-element and a further stator tooth.

According to a further exemplary embodiment of the present invention, a sum of a first length of the first sub-element in the first direction, a second length of the second sub-element in the first direction and a third length of the third sub-element in the first direction is a total length in the first direction. Furthermore, a middle of the second length of the second sub-element in the first direction is distanced in the first direction from a middle of the total length in the first direction.

According to a further exemplary embodiment of the present invention, the first sub-element, the second sub-element and the third sub-element are formed as an integral part.

Furthermore, when the covering element comprises the first sub-element and the second sub-element, the first sub-element and the second sub-element are formed as an integral part.

Forming the first sub-element, the second sub-element and the third sub-element may be performed by pressing and heat treatment of two or more powder materials with different magnetic properties.

By forming the covering element as an integral part, the stability against wear and material fatigue at the interfaces between the different sub-elements of the covering element may be enhanced. Hence, the life-time of the covering element may be increased.

By forming the magnetic first sub-element and third sub-element, respectively, by a vacuum pressure impregnation process together with the non-magnetic second sub-element, stress peaks due to material borders may be omitted.

According to a further aspect of embodiments of the present invention, a stator for an electromagnetic machine is disclosed. The stator comprises at least two teeth, and at least one covering element as described above. Each of the at least two teeth comprises a tooth tip with a groove. The at least one covering element is arranged in-between the at least two tooth tips. The first sub-element comprises a first coupling section and the third sub-element comprises the second coupling section. Further, the first coupling section and the second coupling section are each coupled in the respective groove of the two tooth tips.

Further, when the covering element comprises solely the first sub-element and the second sub-element, the first sub-element comprises the first coupling section and the second sub-element comprises the second coupling section.

The groove in the tooth tip is formed as the negative to the coupling section formed as a protrusion. The covering element is press-fitted between the two tooth tips. Hence, the covering element may ensure the spatial arrangement of the coil in the slot between two adjacent teeth.

Furthermore, the slot in-between two adjacent teeth may not be narrowed by a radially enlarged tooth tip. Therefore, an easy insertion of the coil without a semi-closed or asymmetric tooth tip, may be ensured.

Hence, no damage of the coil insulation during insertion occurs. Additionally, no special coil tool must be used. Instead, a simple robotic arm may be used for the insertion.

According to a further exemplary embodiment of the present invention, the respective groove has a shape being complementary to a shape of a first coupling section or a second coupling section.

The shape of the groove is the negative of the shape of the coupling section, wherein the covering element is press-fitted to the stator teeth. Hence, the holding force is increased due to a surface contact extending over the entire surface of the coupling section.

The shape of the slot and the coupling section may depend for example on manufacturability of the shape as well as on frictional aspects.

According to a further aspect of embodiments of the present invention, a method of forming a covering element is described. The method comprises providing a first sub-element and providing a second sub-element. Further, arranging the first sub-element and the second sub-element adjacent to each other in the first direction, wherein the second sub-element is made of a different material than the first sub-element.

According to a further exemplary embodiment of the present invention, the first sub-element and the second sub-element are made as one integral part.

According to a further exemplary embodiment of the present invention, the first sub-element and the second sub-element are made by pressing and heat treatment of a powder with different magnetic properties.

Furthermore, when the method comprises providing a first sub-element, providing a second sub-element and providing a third sub-element, arranging the first sub-element, the second sub-element and the third sub-element adjacent to each other in the first direction such that the second sub-element is arranged in-between the first sub-element and the third sub-element, wherein the second sub-element is made of a different material than the first sub-element and a third sub-element, then the first sub-element, the second sub-element and the third sub-element are made by pressing and heat treatment of a powder with different magnetic properties.

It has to be noted that embodiments of the invention have been described with reference to different subject-matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject-matter also any combination between features relating to different subject-matters, in particular between features of the apparatus type claims and features of the method type claims is considered as to be disclosed with this application.

BRIEF DESCRIPTION

Some of the embodiments will be described in detail, with references to the following Figures, wherein like designations denote like members, wherein:

FIG. 4 shows a covering element according to an exemplary embodiment of the present invention;

FIG. 5 shows a stator and a covering element according to an exemplary embodiment of the present invention;

DETAILED DESCRIPTION

Figure 1:
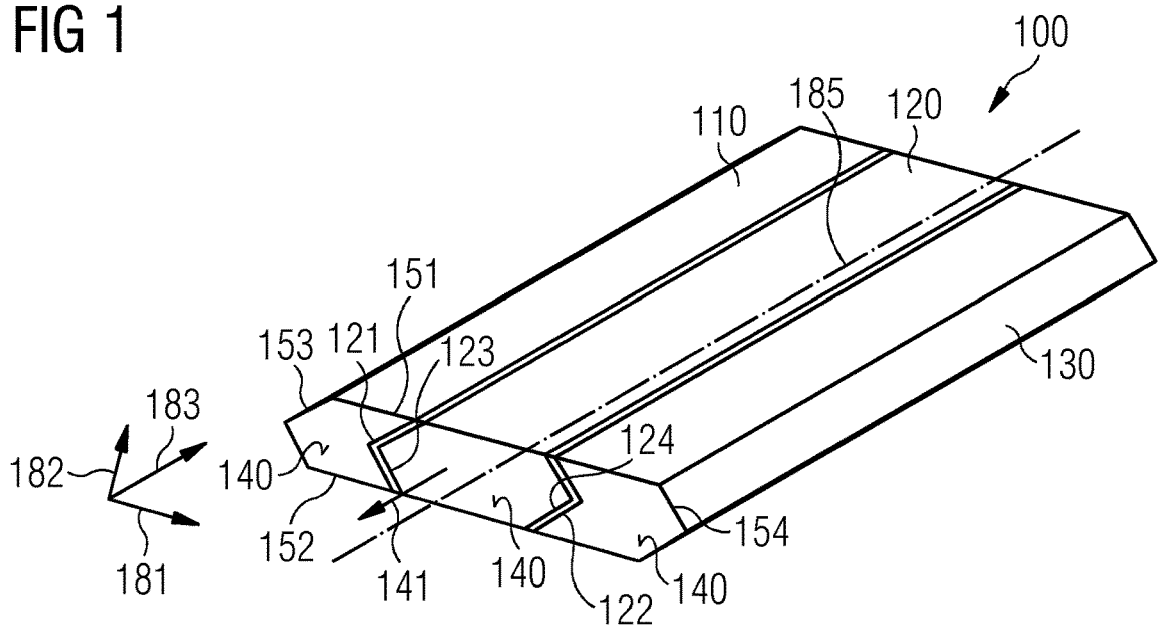
FIG. 1 shows a covering element according to an exemplary embodiment of the present invention.

The illustrations in the drawings are schematically. It is noted that in different figures, similar or identical elements are provided with the same reference signs.

FIG. 1 shows a covering element 100 according to an exemplary embodiment of the invention. The covering element 100 comprises a first sub-element 110, a second sub-element 120 and a third sub-element 130. The first sub-element 110, the second sub-element 120 and the third sub-element 130 are arranged adjacent to each other in a first direction 181. The second sub-element 120 is made from a different material than the first sub-element 110 and the third sub-element 130.

A second direction 182 extends perpendicular to the first direction 181 and a third direction 183 extends perpendicular to the first direction 181 and the second direction 182. A first cross-sectional surface 140 of the covering element 100 comprises a first normal 141 being parallel to the third direction 183. The first cross-sectional surface 140 comprises a first outer surface 151 which extends parallel to the first direction 181, a second outer surface 152 which extends parallel to the first direction 181 and is distanced from the first outer surface 151. Additionally, the first outer surface 151 and the second outer surface 152 are interconnected by a first coupling section 153 and a second coupling section 154, respectively. Further, the first coupling section 153 is distanced from the second coupling section 154.

As depicted in FIG. 1, the first coupling section 153 and the second coupling section 154 are each a protrusion in the shape of a V. Additionally, the first coupling section 153 and the second coupling section 154 are axis-symmetric to a middle axis 185 of the covering element 100. The middle axis 185 is parallel to the third direction 183 and is positioned in a middle of the total length of the covering element 100 in the first direction 181.

The first sub-element 110 comprises a first coupling surface 121 being an interface to the second sub-element 120 and distanced from the first coupling section 153 in the first direction 181. Similarly, the third sub-element 130 comprises a second coupling surface 122 being an interface to the second sub-element 120 and distanced from the second coupling section 154 in the first direction. The second sub-element 120 comprises a third coupling surface 123 being an interface to the first sub-element 110, and a fourth coupling surface 124 being an interface to the third sub-element 130. The third coupling surface 123 and the fourth coupling surface 124 are distanced from each other in the first direction 181.

Additionally, the third coupling surface 123 is formed corresponding to the first coupling surface 121 and the fourth coupling surface 124 is formed corresponding to the second coupling surface 122. Particularly, when the first coupling surface 121 is formed as a groove in the first sub-element 110, the third coupling surface 123 is formed as a corresponding protrusion in the second sub-element. Accordingly, when the fourth coupling surface 124 is formed as a groove in the third sub-element 130, the fourth coupling surface 124 is formed as a corresponding protrusion in the second sub-element 120.

As depicted in FIG. 1, the first coupling surface 121 is formed as a V-shaped groove in the first sub-element 110 and the second coupling surface 122 is formed as a V-shaped groove in the third sub-element 130. Accordingly, the third coupling surface 123 and the fourth coupling surface 124 are formed as corresponding V-shaped protrusions.

The first coupling surface 121, the second coupling surface 122, the third coupling surface 123 and/or the fourth coupling surface 124 may be formed as a groove or as a protrusion, for example in the shape of a V, a W, a semi-circle, a semi-ellipse, a triangle, a semi-drop, a polygon, and/or a rectangle.

Figure 2:
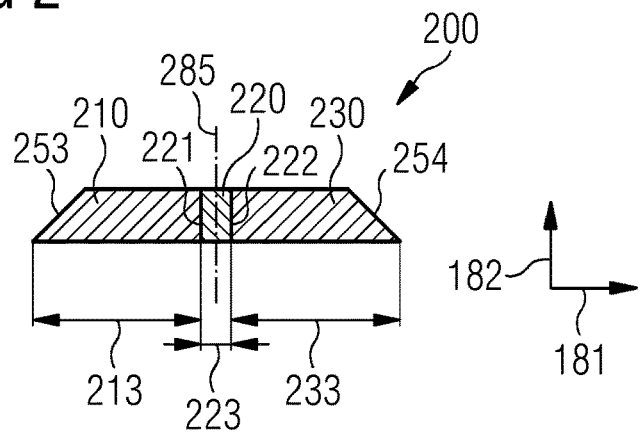
FIG. 2 shows a cross-section of a covering element according to an exemplary embodiment of the present invention made from powder pressed together and heat treated.

FIG. 2 shows a cross-section of a covering element 200 according to an exemplary embodiment of the invention. The normal of the cross-section is the first normal 141 (shown in FIG. 1) which is parallel to the third direction 183.

A first sub-element 210, a second sub-element 220 and a third sub-element 230 are arranged one adjacent to another in the first direction 181. The second sub-element 220 is arranged in-between the first sub-element 210 and the third sub-element 230 in the first direction 181. A first length 213 is the length of the first sub-element 210 in the first direction 181. A second length 223 is the length of the second sub-element 220 and a third length 233 is the length of the third sub-element 230, each in the first direction 181. The first sub-element comprises a first coupling section 253 which is formed different from the first coupling section 153 (shown in FIG. 1). The first coupling section 253 is in the shape of a triangle. A second coupling section 254 is formed as an axis-symmetric triangle as well. The first coupling section 253 and the second coupling section 254 are axis-symmetric to a middle axis 285. A first coupling surface 221 and a second coupling surface 222 are each formed straight, i.e. parallel to the second direction 182. Hence, the first coupling surface 221 and the first coupling section 253 are of different shape. Furthermore, the second coupling surface 222 and the second coupling section 254 are also of different shape.

The first length 213 in the first direction 181 is measured from the first coupling surface 221 to the point of inflexion of the first coupling section 253, which is the point of inflexion of the triangle. In the same manner, the third length 233 in the first direction 181 is measured from the second coupling surface 222 to the point of inflexion of the second coupling section 254, which is the point of inflexion of the triangle. The second length 223 in the first direction 181 is measured from the first coupling surface 221 to the second coupling surface 222.

As depicted in FIG. 2, the second length 223 is smaller than the first length 213 and the third length 233, respectively. At the same time, the first length 213 and the third length 233 are identical. The covering element 200 is formed such that the second sub-element 220 is arranged in the middle of the covering element 200 in the first direction 181. Hence, the covering element 200 is a symmetric covering element 200. In this exemplary embodiment, the second sub-element 220 is made of a non-magnetic material. Hence, the second length 223 in the first direction 181 is sufficiently great to ensure that no magnetic flux may leak between the first sub-element 210 and the third sub-element 230.

Figure 3:
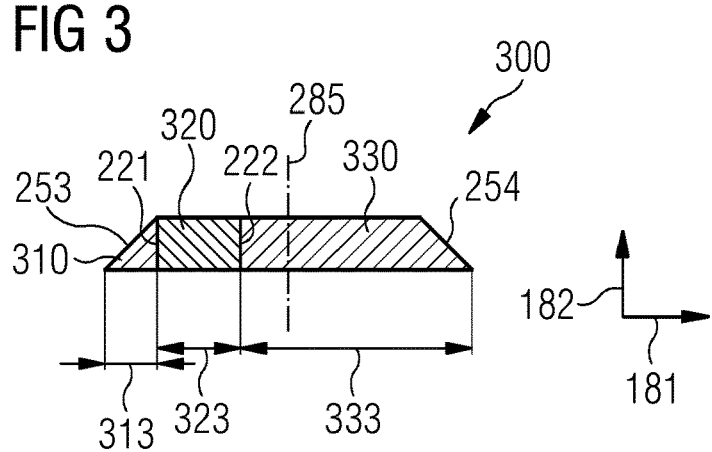
FIG. 3 shows a cross section of a covering element according to an exemplary embodiment of the present invention made from powder pressed together and heat treated.

FIG. 3 shows a cross section of a covering element 300 according to an exemplary embodiment of the invention. The cross-section has a first normal 141 being parallel to the third direction 183 (shown in FIG. 1).

A first sub-element 310, a second sub-element 320 and a third sub-element 330 are arranged one adjacent to another in the first direction 181. The second sub-element 320 is arranged in-between the first sub-element 310 and the third sub-element 330 in the first direction 181. A first length 313 is the length of the first sub-element 310 in the first direction 181. A second length 323 is the length of the second sub-element 320 and a third length 333 is the length of the third sub-element 330, each in the first direction 181.

The first sub-element 310 comprises a first coupling section 253 which is formed identical to the first coupling section 253 in FIG. 2, i.e. in the shape of a triangle. A second coupling section 254 is formed as a triangle as well. The first coupling section 253 and the second coupling section 254 are axis-symmetric to the middle axis 285. A first coupling surface 221 and a second coupling surface 222 are each formed straight, i.e. parallel to the second direction 182. Hence, the first coupling surface 221 and the first coupling section 253 are of different shape. Furthermore, the second coupling surface 222 and the second coupling section 254 are also of different shape.

A first length 313 of the first sub-element 310 is smaller than a second length 323 of the second sub-element 320, which is itself smaller than a third length 333 of the third sub-element 330. The covering element 300 is formed such that the second sub-element 320 is arranged eccentric from the middle of the covering element 300 in the first direction 181. In FIG. 3, the second sub-element 320 is arranged on the left side of the cross-section. When the covering element 300 is arranged in-between two adjacent teeth of the stator a magnetic flux linkage from the first sub-element 310 via the first coupling section 253 to one stator tooth is smaller than a magnetic flux linkage from the third sub-element 330 via the second coupling section 254 to another tooth.

FIG. 4 shows a covering element 400 according to an exemplary embodiment of the present invention. The covering element 400 comprises a first sub-element 410, a second sub-element 420 and a third sub-element 430, which are arranged one adjacent to another in the same order in the first direction 181. As may be seen in FIG. 4, arranged one adjacent to another means that a bigger part of the second sub-element 420 is arranged in-between the first sub-element 410 and the third sub-element 430, although the second sub-element comprises two first protrusions 415 which extend from the second sub-element 420 to the first coupling section 453. Additionally, the second sub-element 420 comprises two second protrusions 435 which extend from the second sub-element 420 to the second coupling section 454.

There may be an enlarged contact area between the second sub-element 420 and the first sub-element 410 and the third sub-element 430, respectively, due to the two first protrusions 415 and the two second protrusions 435. Hence, an interconnection of the second sub-element 420 to the first sub-element 410 and the third sub-element 430, respectively, may be reinforced.

Each of the two first protrusions 415 extends in the first direction 181 into the first sub-element 410 over a small portion in the third direction 183. Therefore, the bigger part of the first coupling section 453 in the third direction consists of the first sub-element 410. In the third direction 183, the one of the first protrusion 415 and one of the second protrusion 435 are alternatingly arranged.

Similarly, each of the first protrusions 415 extends over less than one third of the first sub-element 410 in the second direction 182. Hence, the bigger part of the first coupling section 453 consists of the first sub-element 410. The two second protrusions 435 are formed accordingly to the two first protrusions 415.

The first coupling section 453 is formed with a rectangular first connecting protrusion 455 and the second coupling section 454 is formed with a rectangular second connecting protrusion 456. The first connecting protrusion 455 and the second connecting protrusion 456 may each be coupled to a respective groove in a stator tooth.

Hence, a first coupling surface 421 is enlarged compared to the first coupling surface 121 as shown in FIG. 1. Similarly, the second coupling surface 422 is enlarged compared to the second coupling surface 122 as shown in FIG. 1. Additionally, in the third direction 183 a width of the first protrusion 415 and the second protrusion 435 increases along the first direction. Corresponding grooves in the first sub-element 410 and the third sub-element 430, respectively, are provided. Hence, a dove-tail connection is provided between the second sub-element 420 and the first sub-element 410 and the third sub-element 430, respectively. By this dove-tail connection the fixation of the second sub-element 420 in-between the first sub-element 410 and the third sub-element 430 is increased and reinforced.

FIG. 5 shows a stator 500 and a covering element 100 according to an exemplary embodiment of the invention.

The covering element 100 is formed according to the covering element 100 as shown and described in more detail in FIG. 1. The covering element 100 comprises a first sub-element 110, a second sub-element 120 and a third sub-element 130 arranged one adjacent to the other in the first direction 181. The first sub-element 110 comprises the first coupling section 153 and the third sub-element 130 comprises the second coupling section 154.

The first direction 181 extends parallel to the circumferential direction of the stator 500. The second direction 182 extends parallel to the radial direction of the stator 500 and the third direction 183 extends parallel to the axial direction of the stator 500.

The stator 500 comprises a first tooth 561 and a second tooth 562 with a slot 565 in-between the first tooth 561 and the second tooth 562. The first tooth 561 comprises a first groove 563 in its tip region and the second tooth 562 comprises a second groove 564 in its tip region. The first coupling section 153 is a protrusion with a V-shape and the first groove 563 has a complementary V-shape. Similarly, the second coupling section 154 is a protrusion with a V-shape and the second groove 564 has a complementary V-shape. The covering element 100 is inserted in the stator 500 by moving the covering element 100 in an inserting direction 580 being parallel to an axial direction of the stator and the third direction 183, respectively. When the covering element 100 is inserted into the slot 565, the slot 565 is closed in the radial direction and second direction 182, respectively. Hence, when a coil (not shown in FIG. 5) is inserted into the slot 565, the coil is securely held in place in the slot 565 by the covering element 100.

A length of the covering element 100 in the third direction 183 corresponds to the axial length of the stator 500 (not drawn to scale in FIG. 5).

Figure 6:
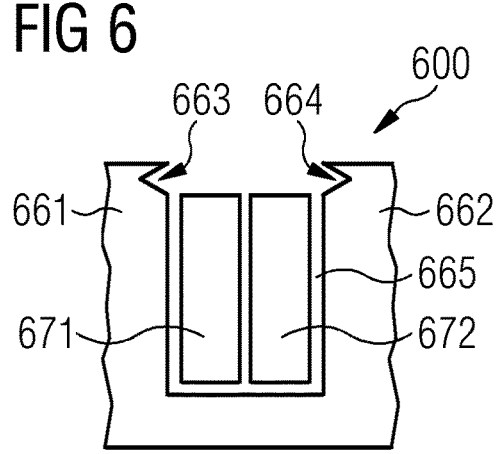
FIG. 6 shows a stator with an inserted coil before mounting the covering element according to an exemplary embodiment of the present invention.

FIG. 6 shows a stator 600 with an inserted coil 671, 672 before mounting a covering element 100 according to embodiments of the present invention.

The stator 600 comprises a first tooth 661 with a first groove 663 in its tip region and a second tooth 662 with a second groove 664 in its tip region.

In a first mounting step, a first coil 671 and subsequently a second coil 672 are inserted into a slot 665 between the first tooth 661 and the second tooth 662. A first groove 663 is formed in a tip region of the first tooth 661 such that a total width of the slot 665 is not narrowed in the tip region. A second groove 664 is formed in the tip region of the second tooth 662 accordingly. Hence, the first coil 671 and the second coil 672 may be inserted into the slot 665 without using a special tool.

Figure 7:
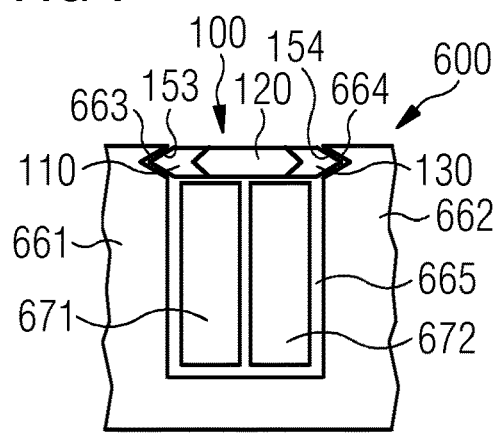
FIG. 7 shows the stator of FIG. 6 after mounting the covering element according to an exemplary embodiment of the present invention.
Figure 8:
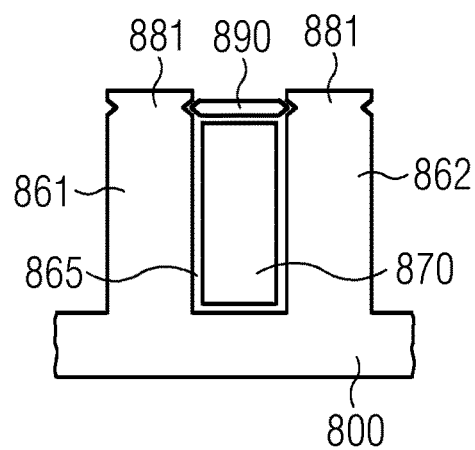
FIG. 8 shows a conventional stator with an inserted conventional covering element according to the prior art.

FIG. 7 shows the stator 600 of FIG. 6 after mounting the covering element 100 according to embodiments of the invention.

The covering element 100 comprises the first sub-element 110 with the first coupling section 153, the second sub-element 120 and the third sub-element 130 with the second coupling section 154. The first coupling section 153 is formed as a V-shaped protrusion and the first groove 663 is formed as a corresponding V-shape. The second coupling section 154 is formed in a V-shaped protrusion just as the first coupling section 153, and the second groove 664 is formed in a corresponding V-shape. As shown in FIG. 7 the first coupling section 153 is press-fitted to the first groove 663 and the second coupling section 154 is press-fitted to the second groove 664, respectively. After inserting the covering element 100, the covering element 100 closes the slot 665 and securely holds the first coil 671 and the second coil 672 in place.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The claims are as follows:

1. A covering element for covering a slot between two adjacent teeth of an electromagnetic machine, the covering element comprising:
   a first sub-element;
   a second sub-element; and
   a third sub-element;
   wherein the first sub-element, the second sub-element, and the third sub-element are arranged adjacent to each other in a first direction, such that the second sub-element is arranged in-between the first sub-element and the third sub-element;
   wherein the second sub-element is made of a different material than the first sub-element and the third sub-element;
   wherein a sum of a first length of the first sub-element in the first direction, a second length of the second sub-element in the first direction and a third length of the third sub-element in the first direction is a total length in the first direction, further wherein a middle of the second length of the second sub-element in the first direction is distanced in the first direction from a middle of the total length in the first direction.

2. The covering element according to claim 1, wherein the first sub-element and the third sub-element are configured for being each coupled to a tip region of a tooth.

3. The covering element according to claim 1, wherein a first magnetic permeability of the first sub-element is higher than a second magnetic permeability of the second sub-element.

4. The covering element according to claim 1, wherein a third magnetic permeability of the third sub-element is higher than the second magnetic permeability of the second sub-element.

5. The covering element according to claim 1, wherein the second sub-element is made of a non-magnetic material or a soft magnetic material, further wherein the first sub-element and the third sub-element are made of a magnetic material or a soft magnetic material.

6. The covering element according to claim 1, wherein a sum of a first length of the first sub-element in the first direction, a second length of the second sub-element in the first direction and a third length of the third sub-element in the first direction is a total length in the first direction, further wherein a middle of the second length of the second sub-element in the first direction coincides with a middle of the total length in the first direction.

7. The covering element according to claim 1, wherein the first sub-element, the second sub-element and the third sub-element are formed as an integral part.

8. A stator for an electromagnetic machine, the stator comprising:
at least two teeth; and at least one covering element according to claim 1,
wherein each of the at least two teeth comprises a tip region with a groove,
wherein the at least one covering element is arranged in-between the at least two teeth,
wherein the first sub-element comprises a first coupling section,
wherein the third sub-element comprises a second coupling section,
wherein the first coupling section and the second coupling section are each coupled in the respective groove of the two teeth.

9. The stator according to claim 8, wherein the respective groove has a shape being complementary to a shape of a first coupling section or a second coupling section.

10. A method of forming a covering element,
providing a first sub-element;
providing a second sub-element;
providing a third sub-element; and
arranging the first sub-element, the second sub-element, and the third sub-element adjacent to each other in the first direction, such that the second sub-element is arranged in-between the first sub-element and the third sub-element;
wherein the second sub-element is made of a different material than the first sub-element and the third sub-element;
wherein a sum of a first length of the first sub-element in the first direction, a second length of the second sub-element in the first direction and a third length of the third sub-element in the first direction is a total length in the first direction, further wherein a middle of the second length of the second sub-element in the first direction is distanced in the first direction from a middle of the total length in the first direction.

11. The method according to claim 10, wherein the first sub-element and the second sub-element are made as one integral part.

12. The method according to claim 11, wherein the first sub-element and the second sub-element are made by pressing and heat treatment of a powder with different magnetic properties.

* * * * *